(12) United States Patent
Wei et al.

(10) Patent No.: US 11,720,607 B2
(45) Date of Patent: *Aug. 8, 2023

(54) SYSTEM FOR LIGHTWEIGHT OBJECTS

(71) Applicant: Open Text Corporation, Waterloo (CA)

(72) Inventors: Shu-Shang Sam Wei, Danville, CA (US); Roger W. Kilday, Danville, CA (US); Victor Spivak, San Mateo, CA (US); Meir Amiel, Pleasanton, CA (US); Venkat Chandrasekaran, Newark, NJ (US); Yik-Ping Li, Fremont, CA (US); David Buccola, Pleasanton, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 109 days.

This patent is subject to a terminal disclaimer.

(21) Appl. No.: 16/909,643

(22) Filed: Jun. 23, 2020

(65) Prior Publication Data

US 2020/0342008 A1  Oct. 29, 2020

Related U.S. Application Data

(63) Continuation of application No. 15/619,318, filed on Jun. 9, 2017, now Pat. No. 10,726,053, which is a continuation of application No. 13/969,101, filed on Aug. 16, 2013, now Pat. No. 9,760,623, which is a continuation of application No. 13/161,580, filed on Jun. 16, 2011, now Pat. No. 8,560,572, which is a continuation of application No. 11/906,185, filed on Sep. 28, 2007, now Pat. No. 7,987,210.

(51) Int. Cl.
*G06F 16/00* (2019.01)
*G06F 16/28* (2019.01)

(52) U.S. Cl.
CPC ............ *G06F 16/289* (2019.01); *G06F 16/28* (2019.01)

(58) Field of Classification Search
CPC ...... G06F 16/289; G06F 16/28; G06F 16/907; G06F 16/23; G06F 16/2343; G06F 16/284; G06F 16/128; G06F 16/174
See application file for complete search history.

(56) References Cited

U.S. PATENT DOCUMENTS 5,313,630 A    5/1994  Namioka
5,787,415 A *  7/1998  Jacobson ............ G06F 16/2365
5,867,649 A *  2/1999  Larson .................... G06F 8/314
                                                        709/201

(Continued)

OTHER PUBLICATIONS

Martin Glibz, "A Lightweight Approach to Consistency of Scenarios and Class Models". IEEE (Year: 2000).*

(Continued)

*Primary Examiner* — Daniel A Kuddus
(74) *Attorney, Agent, or Firm* — Sprinkle IP Law Group

(57) ABSTRACT

Creating an object is disclosed. An instance of a sharable type is created. An instance of a lightweight type is created. The sharable type is designated as a parent of the lightweight type. The instance of the sharable type is designated as a parent of the instance of the lightweight type. The instance of the sharable type is shareable by one or more other instances of the lightweight type.

18 Claims, 6 Drawing Sheets

(56) References Cited

U.S. PATENT DOCUMENTS

| | | | |
|---|---|---|---|
| 6,457,065 B1* | 9/2002 | Rich | G06F 16/2379 |
| | | | 719/329 |
| 7,149,744 B1* | 12/2006 | Tenorio | G06Q 30/06 |
| | | | 707/999.102 |
| 7,487,176 B2 | 2/2009 | MacLeod | |
| 7,730,060 B2 | 6/2010 | Chakrabarti | |
| 7,987,210 B1 | 7/2011 | Wei et al. | |
| 7,987,470 B1 | 7/2011 | Wei et al. | |
| 8,301,666 B2 | 10/2012 | Kinder | |
| 8,313,630 B2* | 11/2012 | Grabowski | B01D 61/48 |
| | | | 204/647 |
| 8,326,871 B2 | 12/2012 | Rowley | |
| 8,560,572 B2 | 10/2013 | Wei et al. | |
| 8,656,410 B1 | 2/2014 | Wei et al. | |
| 8,869,301 B2 | 10/2014 | Reeves | |
| 8,909,788 B2 | 12/2014 | Heidenreich | |
| 9,009,731 B2 | 4/2015 | Wei et al. | |
| 9,760,623 B2 | 9/2017 | Wei et al. | |
| 10,726,053 B2 | 7/2020 | Wei | |
| 2002/0191018 A1* | 12/2002 | Broussard | G06F 8/38 |
| | | | 715/746 |
| 2003/0004952 A1* | 1/2003 | Nixon | G05B 19/4145 |
| 2003/0037181 A1* | 2/2003 | Freed | H04L 67/34 |
| | | | 709/202 |
| 2003/0189601 A1 | 10/2003 | Ben-Shachar | |
| 2003/0212987 A1 | 11/2003 | Demuth | |
| 2003/0226011 A1 | 12/2003 | Kuwano | |
| 2004/0003371 A1* | 1/2004 | Coulthard | G06F 8/24 |
| | | | 709/219 |
| 2004/0204073 A1 | 10/2004 | Yanosy | |
| 2004/0210607 A1* | 10/2004 | Manchanda | G06F 16/283 |
| | | | 707/999.203 |
| 2005/0010580 A1* | 1/2005 | Lancefield | G06F 16/289 |
| 2005/0086656 A1* | 4/2005 | Whitlock | G06F 9/52 |
| | | | 718/1 |
| 2005/0257211 A1* | 11/2005 | Chatterjee | G06F 8/656 |
| | | | 717/170 |
| 2005/0283718 A1* | 12/2005 | Wilson | G06F 16/972 |
| | | | 715/201 |
| 2005/0289600 A1 | 12/2005 | Kawahara | |
| 2017/0344627 A1 | 11/2017 | Wei et al. | |

OTHER PUBLICATIONS

Fang et al., Lightweight Sensing and Communication Protocols for Target Enumeration and Aggregation; ACM 2003.*

Martin Glibz, "A Lightweight Approach to Consistency of Scenarios and Class Models". IEEE 2000.*

Simon, Barbara, et al., "A Foundation of Sequentializing Parallel Code," Extended Abstract, ACM 1990, pp. 350-359.

Bowden, Tanya, "Cooperative Error Handling and Shallow Processing," EACL 1995, Proceedings of the seventh conference on European chapter of the Association for Computational Linguistics, Dublin, Ireland, pp. 297-300.

Canning, Peter S., et al., "Interfaces for Strongly-Typed Object-Oriented Programming," OOPSLA, '89 Conference proceedings on Object-oriented programming systems, languages and applications, New Orleans, Louisiana, Oct. 1-6, 1989, pp. 457-467.

Hornick, Mark, et al., "A shared, segmented memory system for an object-oriented database," ACM Transaction of Information Systems (TOIS), vol. 5, Issue 1, Jan. 1987, pp. 70-95.

Decker, Stefan et al., "The Semantic Web: The Roles of XML and RDF," IEEE Internet Computing, Sep./Oct. 2000, vol. 4 Issue 5, pp. 63-73.

Reekie, H. John, et al., "Lightweight Component Models for Embedded Systems," Technical Memorandum UCB ERL M02/30, Electronics Research Laboratory, University of California at Berkeley, Oct. 2002, pp. 1-25.

Nolte, Jorg, et al., "An Object Oriented Computing Surface for Distributed Memory Architectures," Proceeding of the Twenty-Sixth Hawaii International Conference on System Sciences, Wailea, HI, Jan. 8, 1993, vol. 2, pp. 134-143.

Office Action for U.S. Appl. No. 11/906,185, dated Nov. 24, 2009, 10 pages.

Office Action for U.S. Appl. No. 11/906,185, dated Jun. 22, 2010, 11 pages.

Office Action for U.S. Appl. No. 11/906,185, dated Oct. 4, 2010, 13 pgs.

Office Action for U.S. Appl. No. 11/906,184, dated Nov. 24, 2010, 6 pgs.

Office Action for U.S. Appl. No. 11/906,174, dated Feb. 4, 2011, 12 pgs.

Office Action for U.S. Appl. No. 11/906,174, dated Aug. 16, 2011, 15 pgs.

Office Action for U.S. Appl. No. 13/161,580, dated Nov. 5, 2012, 16 pgs.

Office Action for U.S. Appl. No. 11/906,174, dated Jun. 20, 2013, 11 pgs.

Office Action for U.S. Appl. No. 14/148,052, dated Aug. 26, 2014, 11 pgs.

Office Action for U.S. Appl. No. 13/969,101, dated Nov. 23, 2015, 21 pages.

Office Action for U.S. Appl. No. 13/969,101, dated May 13, 2016, 17 pages.

Notice of Allowance for U.S. Appl. No. 13/969,101, dated Dec. 8, 2016, 11 pgs.

Office Action for U.S. Appl. No. 15/619,318, dated Jul. 31, 2019, 18 pages.

Office Action for U.S. Appl. No. 15/619,318, dated Jan. 6, 2020, 9 pages.

Notice of Allowance for U.S. Appl. No. 15/619,318, dated Mar. 17, 2020, 6 pages.

* cited by examiner

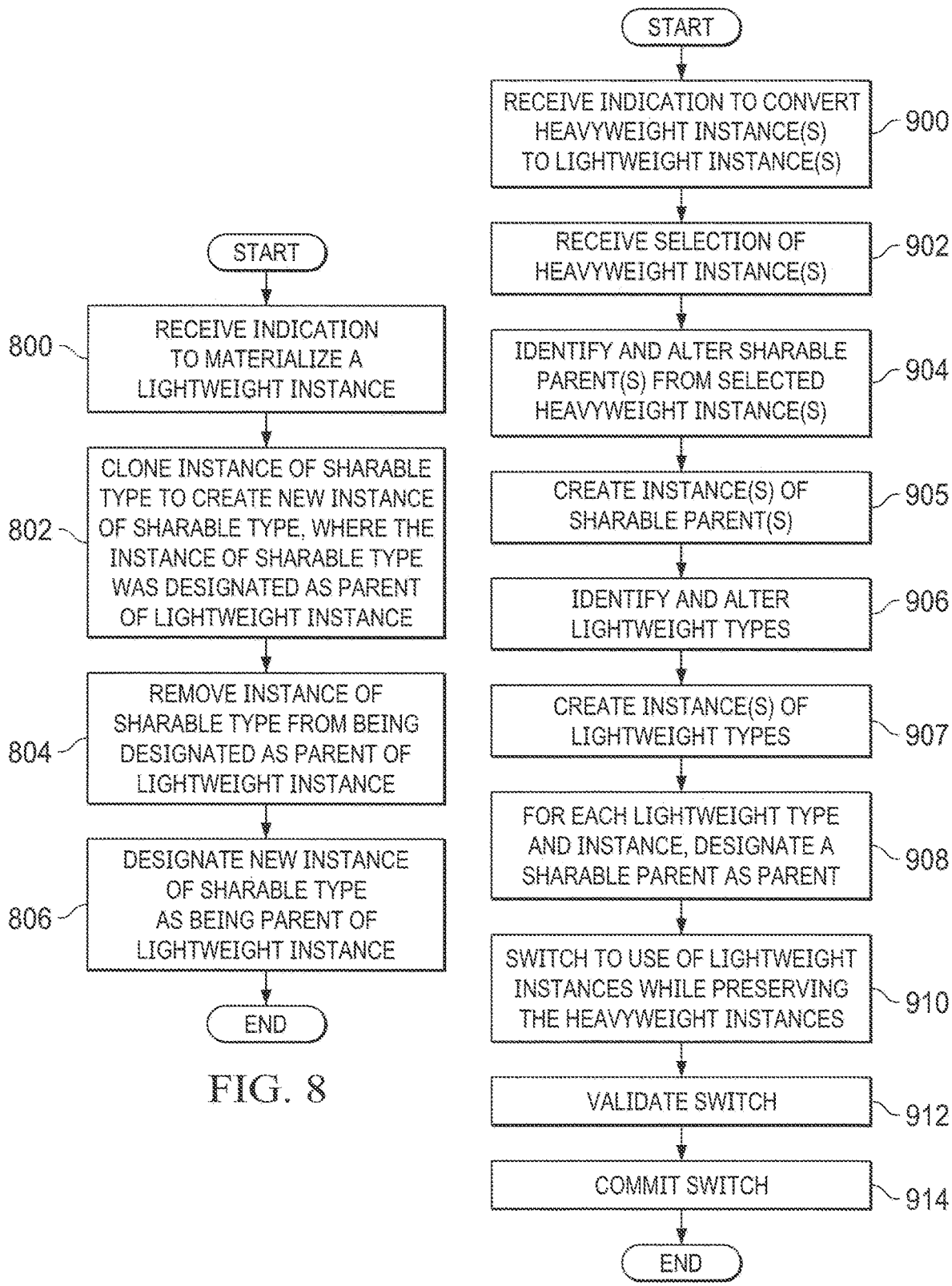

SYSTEM FOR LIGHTWEIGHT OBJECTS

CROSS REFERENCE TO OTHER APPLICATIONS

This application is a continuation of, and claims a benefit of priority under 35 U.S.C. 120 from U.S. patent application Ser. No. 15/619,318 filed Jun. 9, 2017, entitled SYSTEM FOR LIGHTWEIGHT OBJECTS, issued as U.S. Pat. No. 10,726,053, which is a continuation of U.S. patent application Ser. No. 13/969,101 filed Aug. 16, 2013, entitled SYSTEM FOR LIGHTWEIGHT OBJECTS, issued as U.S. Pat. No. 9,760,623, which is a continuation of U.S. patent application Ser. No. 13/161,580 filed Jun. 16, 2011, entitled SYSTEM FOR LIGHTWEIGHT OBJECTS, issued as U.S. Pat. No. 8,560,572, which is a continuation of U.S. patent application Ser. No. 11/906,185 filed Sep. 28, 2007, entitled SYSTEM FOR LIGHTWEIGHT OBJECTS, issued as U.S. Pat. No. 7,987,210, all of which are incorporated herein by reference for all purposes.

BACKGROUND OF THE INVENTION

Object classes that have inherited class behavior(s) and/or other data typically have instances of the object represented in memory as an instance of the object and an instance of any class object from which the object inherits behavior(s) and/or data. Similarly, when storing the object, particularly when storing the object in a database, the object instance along with any class object instance inherited from are stored together. If objects inherit from the same class object, then the class object instance is stored for each of the objects. This duplication of stored class object instances leads to inefficient use of memory and/or storage space.

BRIEF DESCRIPTION OF THE DRAWINGS

Various embodiments of the invention are disclosed in the following detailed description and the accompanying drawings.

FIG. 8 is a flow diagram illustrating an embodiment of a process for materializing a lightweight instance.

FIG. 9 is a flow diagram illustrating an embodiment of a process for converting heavyweight instance(s) to lightweight instance(s).

DETAILED DESCRIPTION

Figure 1:
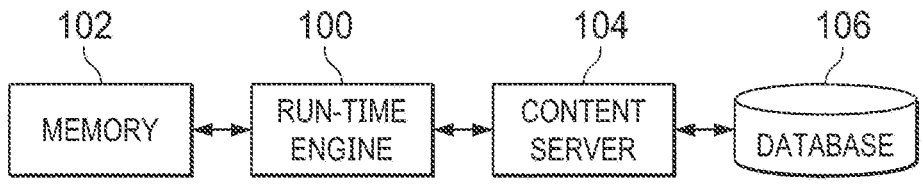
FIG. 1 is a block diagram of a system for lightweight objects.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for lightweight objects is disclosed. A sharable type includes shared class objects—for example, an object that provides to a plurality of lower lightweight type objects by way of inheritance its behaviors and other data. One or more "lightweight" type objects have a sharable type as a parent. Memory and storage savings are achieved by having a plurality of lightweight type objects (and instances thereof) refer to a single sharable type (and instance thereof) as a parent because only a single copy of the sharable type and/or its instance can be stored instead of a copy for each lightweight type composite object as is done for a "heavyweight" type object.

In some embodiments, a sharable type is declared (e.g., created or modified from a previously declared non-sharable type). A lightweight type is declared (e.g., created, modified from a previously declared heavyweight type, or created as a subtype of another lightweight type), where the sharable type is designated as a parent of the lightweight type. An instance is created of the sharable type. An instance is created of the lightweight type, where the instance of the sharable type is designated as the parent of the instance of the lightweight type.

In some embodiments, the composite of a lightweight type and a sharable type or instances thereof perform similarly to a heavyweight object. For example, access to data in the composite of the lightweight type and sharable type or instances thereof perform similarly to accesses to data of a similar heavyweight type. Further, the access produces similar results regardless of whether a user or an application accesses a lightweight object or a corresponding similar heavyweight object.

In some embodiments, a lightweight composite object is materialized to create a new lightweight composite object. For example, a change is requested for data or behavior stored associated with the sharable portion of the composite object. The requested change would potentially impact other lightweight composite objects that share the sharable portion. A copy or clone is made of the sharable portion of the composite object and a new composite object is created from the copy or clone of the sharable portion along with any other appropriate lightweight objects.

In some embodiments, heavyweight instance(s) is/are converted to a lightweight instance(s). A selection of one or more heavyweight instances is received. From the heavyweight instances and associated heavyweight types, sharable parent types and instances are identified and created. From the heavyweight instances and associated heavyweight types, lightweight types and instances are identified and created. For each lightweight type and instance, a sharable type or instance is designated as parent. A switch is made to using the new lightweight instances. The original selected heavyweight instances are preserved in case the lightweight instances do not perform similar to the heavyweight instances. The switch to using the lightweight instances is validated. Validation includes determining whether the lightweight instances perform similarly to the heavyweight instances. If the performance is satisfactory, then the switch is committed. In various embodiments, committing includes deleting the selected heavyweight instances and/or types, archiving the selected heavyweight instances and or types, and any other appropriate action for committing to a switch.

Note that in this specification a type and a class are used interchangeably with regard to objects.

FIG. 1 is a block diagram of a system for lightweight objects. In the example shown, run-time engine 100 processes objects that are class-based hierarchical objects. In some embodiments, run-time engine 100 is a java-based engine that processes objects which may be part of a subclass that inherits attributes and/or behaviors and/or other data from a class. In various embodiments, the inherited data comprise one or more of the following: security data, content data, retention data, policy data, lifecycle data, version data. Run-time engine 100 uses memory 102 to store information during the execution of commands. In some embodiments, memory 102 comprises the processing memory, such as random access memory storing registers or other data, for a processor running run-time engine 100. Run-time engine 100 is able to communicate with content server 104. Content server 104 manages content stored in database storage 106. In some embodiments, database 106 comprises a data repository for content server 104. Management of content by content server 104 includes functionality to search, version, retain, secure, apply policy, process using business processes, or any other appropriate content management functionality.

Figure 2:
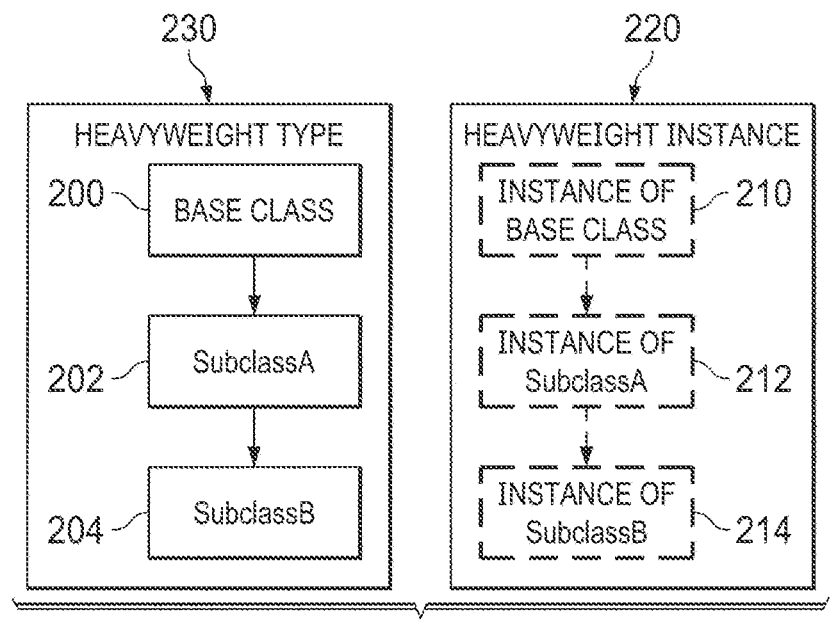
FIG. 2 is a block diagram illustrating an embodiment of a heavyweight type and heavyweight instance.

FIG. 2 is a block diagram illustrating an embodiment of a heavyweight type and heavyweight instance. In some embodiments, heavyweight types and heavyweight instances are processed using a run-time engine such as run-time engine 100 of FIG. 1. In some embodiments, the heavyweight instances, while being processed using the run-time engine, are stored in memory such as memory 102 of FIG. 1. In the example shown, heavyweight type 230 includes base class 200 subclassA 202 and subclassB 204. SubclassB 204 inherits behavior and other data from subclassA 202 and base class 200. Heavyweight instance 220 includes correspondingly instance of base class 210, instance of subclassA 212 (an instance of subclassA 202), and instance of subclassB 214 (an instance of subclassB 204). Instance of subclassB 214 inherits behavior and other data from instance subclassA 212 and instance base class 210.

Note that in the event that there are a plurality of instances of subclassB 214, each have their own copy of subclassA 212 and base class 210. Each of the plurality of instances of subclassB 214 may be different with regard to data associated with each of the instances. However, regardless of whether all copies of subclass A 212 are identical and all copies of base class 210 are identical, each of the plurality of instances of subclassB 214 has a copy of both subclassA 212 and base class 210.

Also, a second heavyweight type that includes base class 200, subclassA 202, and subclassC (not shown in FIG. 2) would similarly have potential redundant storage of base class 200 and subclassA 202 type objects and corresponding instance objects.

Figure 3:
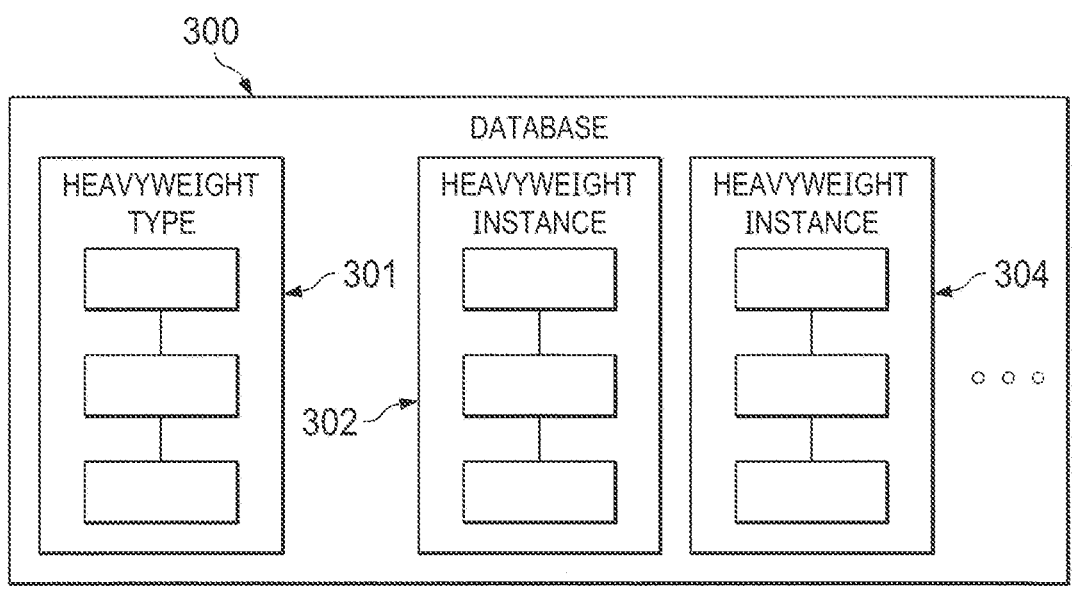
FIG. 3 is a block diagram illustrating an embodiment of a heavyweight type and instance stored in a database.

FIG. 3 is a block diagram illustrating an embodiment of a heavyweight type and instance stored in a database. In some embodiments, the heavyweight instance stored is a heavyweight instance such as heavyweight instance 220 of FIG. 2; the heavyweight type is a heavyweight type such as heavyweight type 230 of FIG. 2; and the database storing the heavyweight instance and heavyweight type is a database such as database 106 of FIG. 1. In the example shown, database 300 stores heavyweight type 301 and a plurality of heavyweight instances, represented in FIG. 3 as heavyweight instance 302 and heavyweight instance 304.

Figure 4A:
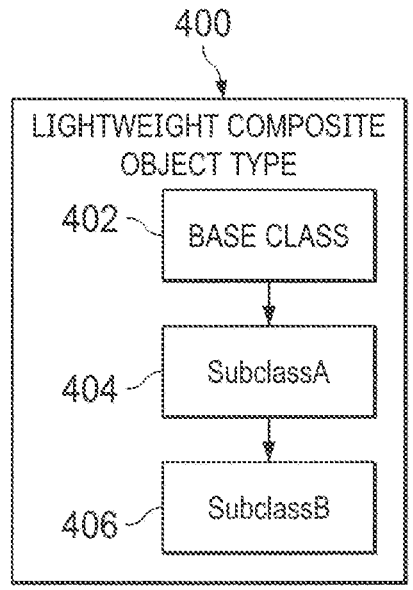
FIG. 4A is a block diagram illustrating an embodiment of a lightweight type.

FIG. 4A is a block diagram illustrating an embodiment of a lightweight type. In some embodiments, lightweight types are stored in a database such as database 106 of FIG. 1. In the example shown, lightweight composite object type 400 includes base class 402 subclassA 404 and subclassB 406. SubclassB 406 inherits behavior and other data from subclassA 404 and base class 402. Base class 402 and subclassA 404 comprise a sharable type. SubclassB comprises a lightweight type.

Figure 4B:
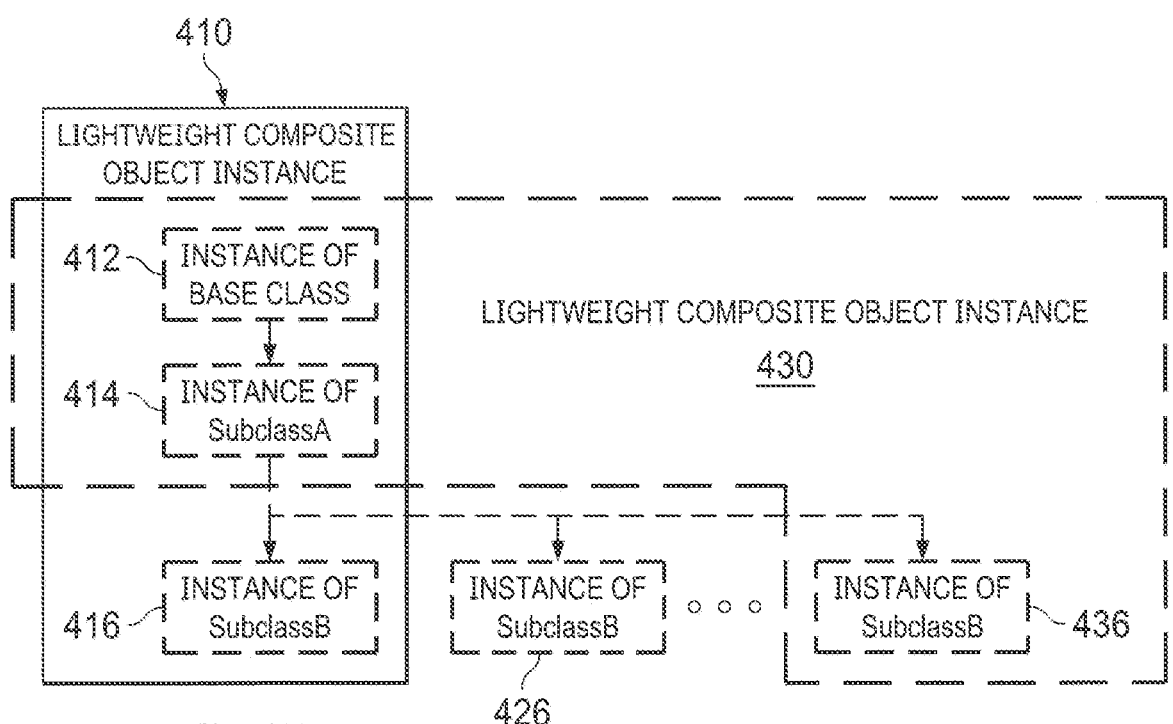
FIG. 4B is a block diagram illustrating an embodiment of a lightweight instance.

FIG. 4B is a block diagram illustrating an embodiment of a lightweight instance. In some embodiments, lightweight instances are processed using a run-time engine such as run-time engine 100 of FIG. 1. In some embodiments, lightweight instances, while being processed using the run-time engine, are stored in memory such as memory 102 of FIG. 1. In the example shown, lightweight composite object instance 410 includes instance of base class 412, instance of subclassA 414 (an instance of subclassA 404), and instance of subclassB 416 (an instance of subclassB 406). Lightweight composite object instance 430 includes instance of base class 412, instance of subclassA 414 (an instance of subclassA 404), and instance of subclassB 436 (an instance of subclassB 406). Lightweight composite object instance 420 (not shown in FIG. 4B) includes instance of base class 412, instance of subclassA 414 (an instance of subclassA 404), and instance of subclassB 426 (an instance of subclassB 406). Instance of subclassB 426 inherits behavior and other data from instance subclassA 414 and instance base class 412. Instance of subclassB 436 inherits behavior and other data from instance subclassA 414 and instance base class 412.

A lightweight composite object instance such as lightweight composite object instance 410, lightweight composite object instance 420, and lightweight composite object instance 430 behave and perform similarly to a heavyweight instance such as heavyweight instance 220 of FIG. 2.

Note there are a plurality of instances of subclassB 406, each share a copy of an instance of subclassA 404 and an instance of base class 402 (e.g., instance of subclassA 414 and instance of base class 412, respectively—a sharable instance). Each of the plurality of instances of subclassB 406 (e.g., instance of subclassB 416, instance of subclassB 426, and instance of subclassB 436) may be different with regard to data associated with each of the instances.

Also, a second lightweight type that includes base class 402, subclassA 404, and subclassC (not shown in FIG. 4) would similarly have the potential for sharing the stored of base class 402 and subclassA 404 type objects (e.g., a sharable type) and corresponding instance objects (e.g., a sharable instance).

Figure 5:
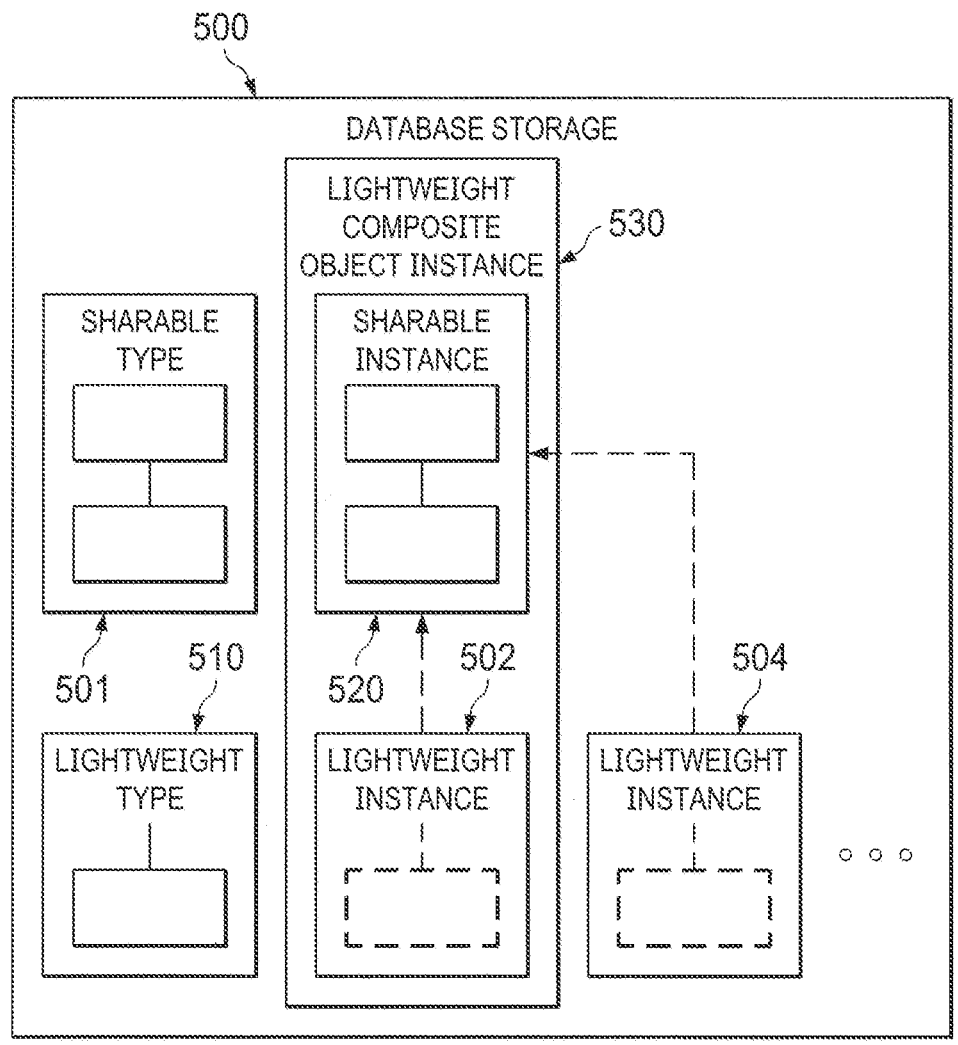
FIG. 5 is a block diagram illustrating an embodiment of a lightweight type, a sharable type, and a lightweight instance stored in a database.

FIG. 5 is a block diagram illustrating an embodiment of a lightweight type, a sharable type, and a lightweight instance stored in a database. In some embodiments, the lightweight instance stored is a lightweight instance such as lightweight instance 410 or lightweight instance 430 of FIG. 4B; the lightweight type is a lightweight type such as lightweight type 400 of FIG. 4A; and the database storing the lightweight instance, lightweight type and sharable type is a database such as database 106 of FIG. 1. In the example shown, database 500 stores lightweight type 510, sharable type 501, sharable instance 520, and a plurality of lightweight instances, represented in FIG. 5 as lightweight instances 502 and lightweight instance 504. Note lightweight instances share an instance (i.e., sharable instance 520) of sharable type 501. Sharable instance 520 and lightweight instance 502 comprise lightweight composite object instance 530. Sharable instance 520 and lightweight instance 504 comprise a lightweight composite object instance (not indicated in FIG. 5).

Figure 6:
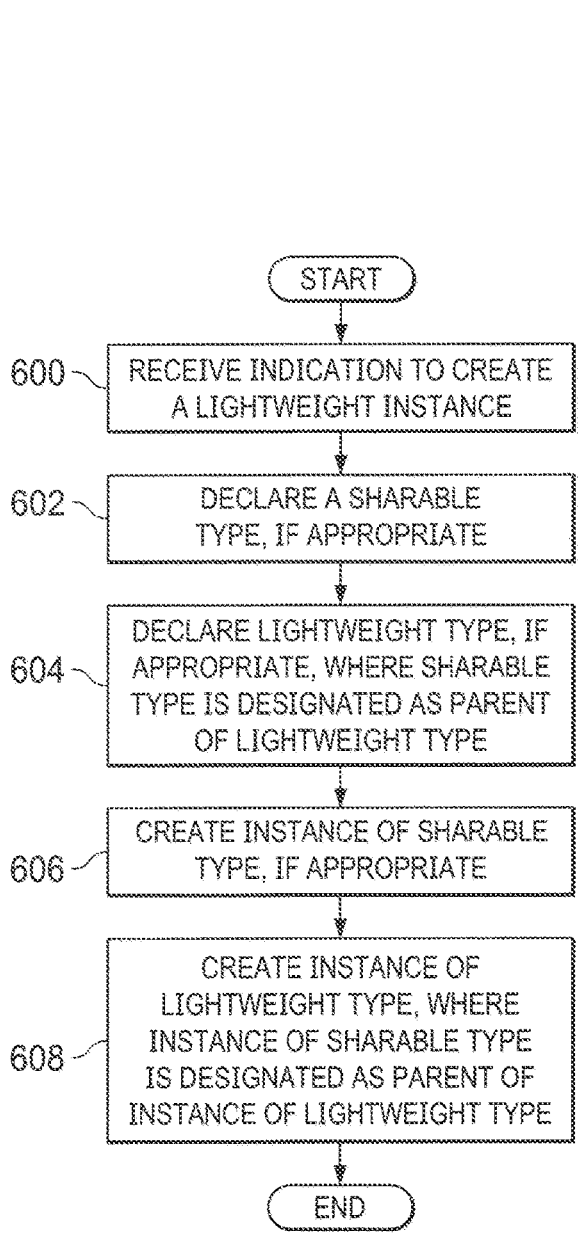
FIG. 6 is a flow diagram illustrating an embodiment of a process for creating a lightweight instance.

FIG. 6 is a flow diagram illustrating an embodiment of a process for creating a lightweight instance. In some embodiments, the process of FIG. 6 is executed using a run-time engine (e.g., run-time engine 100 of FIG. 1) and/or using processing available with regard to a content server (e.g., content server 104 of FIG. 1). In the example shown, in 600 an indication is received to create a lightweight instance. In 602, a sharable type is declared, if appropriate. In the event that the sharable type exists, the sharable type is not declared. In various embodiments, a new sharable type is created, a previously declared non-sharable type is modified, or any other appropriate manner of declaring a sharable type. In 604, a lightweight type is declared, if appropriate, where the sharable type is designated as a parent of the lightweight type. In the event that the lightweight type exists, the lightweight type is not declared. In various embodiments, a new lightweight type is created, a previously declared heavyweight type is modified, a subtype of another lightweight type is created, or any other appropriate manner of declaring a lightweight type. In 606, an instance of the sharable type is created, if appropriate. In the event that the instance of the sharable type exists, the instance of the sharable type is not declared. In 608, an instance of the lightweight type is created, where the instance of the sharable type is designated as the parent of the instance of the lightweight type.

In some embodiments, changing of attributes, behaviors, and/or other data is avoided for attributes, behaviors, and/or other data associated with the sharable parent of a lightweight composite object; a change in these attributes, behaviors, and/or other data associated with the sharable parent will require the creation of a new instance of the sharable parent type that is designated as the parent for the lightweight type. In some embodiments, the creation of a new instance of the sharable parent type is referred to as materialization. In some embodiments, the system automatically executes a materialization process in the event that an attribute, behavior, and/or other data associated with the sharable parent is/are changed or modified for a given lightweight type. In some embodiments, the automatic execution of the creation of the new sharable parent type and instance is referred to as self-materialization.

Figure 7A:
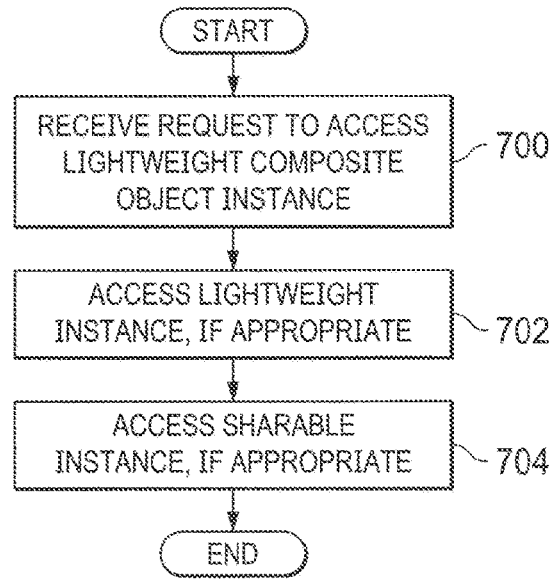
FIG. 7A is a flow diagram illustrating an embodiment of a process for accessing a lightweight composite object instance.

FIG. 7A is a flow diagram illustrating an embodiment of a process for accessing a lightweight composite object instance. In some embodiments, the process of FIG. 7A is used to access a lightweight composite object instance such as lightweight composite object instance 410 of FIG. 4B. In the example shown, in 700 a request is received to access a lightweight composite object instance. In 702, the lightweight instance of the lightweight composite object instance is accessed, if appropriate. In 704, the sharable instance of the lightweight composite object instance is accessed, if appropriate. In some embodiments, a data aggregator is accessed that determines whether to access the lightweight instance and/or the sharable instance.

Figure 7B:
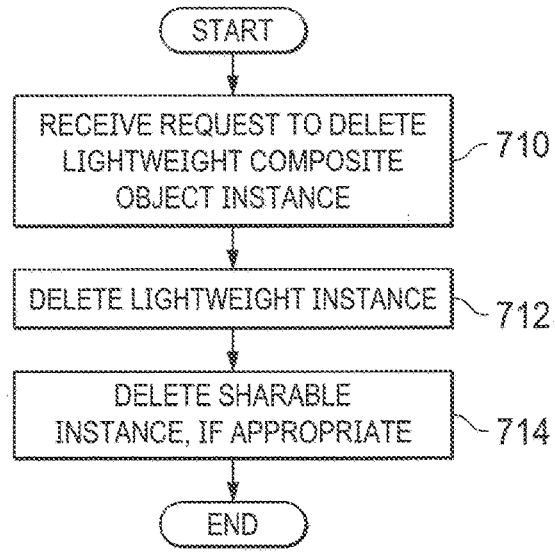
FIG. 7B is a flow diagram illustrating an embodiment of a process for deleting a lightweight composite object instance.

FIG. 7B is a flow diagram illustrating an embodiment of a process for deleting a lightweight composite object instance. In some embodiments, the process of FIG. 7B is used to delete a lightweight composite object instance such as lightweight composite object instance 410 of FIG. 4B. In the example shown, in 710 a request is received to delete a lightweight composite object instance. In 712, the lightweight instance of the lightweight composite object instance is deleted. In 714, the sharable instance of the lightweight composite object instance is deleted, if appropriate. In some embodiments, a sharable instance deleter determines whether to delete the sharable instance (e.g., by determining if the sharable instance is being shared by any other lightweight instance(s)).

FIG. 8 is a flow diagram illustrating an embodiment of a process for materializing a lightweight instance. In the example shown, in 800 an indication is received to materialize a lightweight instance. In 802, an instance of the sharable type is cloned to create a new instance of the sharable type, where the instance of the sharable type was designated as the parent of the lightweight instance. In 804, the instance of the sharable type is removed from being designated as the parent of the lightweight instance. In 806, the new instance of the sharable type is designated as being the parent of the lightweight instance.

In some embodiments, the indication to materialize a lightweight instance is a consequence of receiving an indication to modify an attribute, behavior, or other data associated with a lightweight composite object instance where the attribute, behavior, or other data is associated with the sharable instance of the lightweight composite object instance; the lightweight instance is materialized so that a modification to the attribute, behavior, or other data does not propagate unintentionally to other lightweight composite object instances that share the sharable instance. The modification can then be made to the new sharable instance that is now a part of a new lightweight composite object without the modification impacting other lightweight composite objects.

FIG. 9 is a flow diagram illustrating an embodiment of a process for converting heavyweight instance(s) to lightweight instance(s). In the example shown, in 900 an indication is received to convert heavyweight instance(s) to lightweight instance(s). In 902, a selection is received of heavyweight instance(s). In 904, sharable parent(s) of selected heavyweight instance(s) are identified and altered. For example, a group of heavyweight instances are identified as sharing a common set of higher class types; and the corresponding heavyweight type will be altered to be a sharable parent type that includes the common set of higher class types. In 905, sharable parent instances are created. In 906, lightweight types and instances of lightweight types are identified and altered. For example, for a group of heavyweight instances that have been identified as sharing a common set of higher class types, the lower class types that are not shared for the group are identified as lightweight types; the corresponding heavyweight types will be altered to be the lightweight types that include the lower class types. In 907, lightweight instances of the types are created. In 908, for each lightweight type and instance of the lightweight type, a sharable parent or instance of a sharable parent is designated. In 910, a switch is made to use of the lightweight instances, while preserving the heavyweight instances. In 912, the switch is validated. Validating includes determining if the lightweight instances perform similar to the selected heavyweight types. In 914, the switch is committed. In various embodiments, committing the switch includes deleting the heavyweight instances, deleting the heavyweight types, archiving the heavyweight instances, archiving the heavyweight types, or any other appropriate action for committing a switch.

Figure 10:
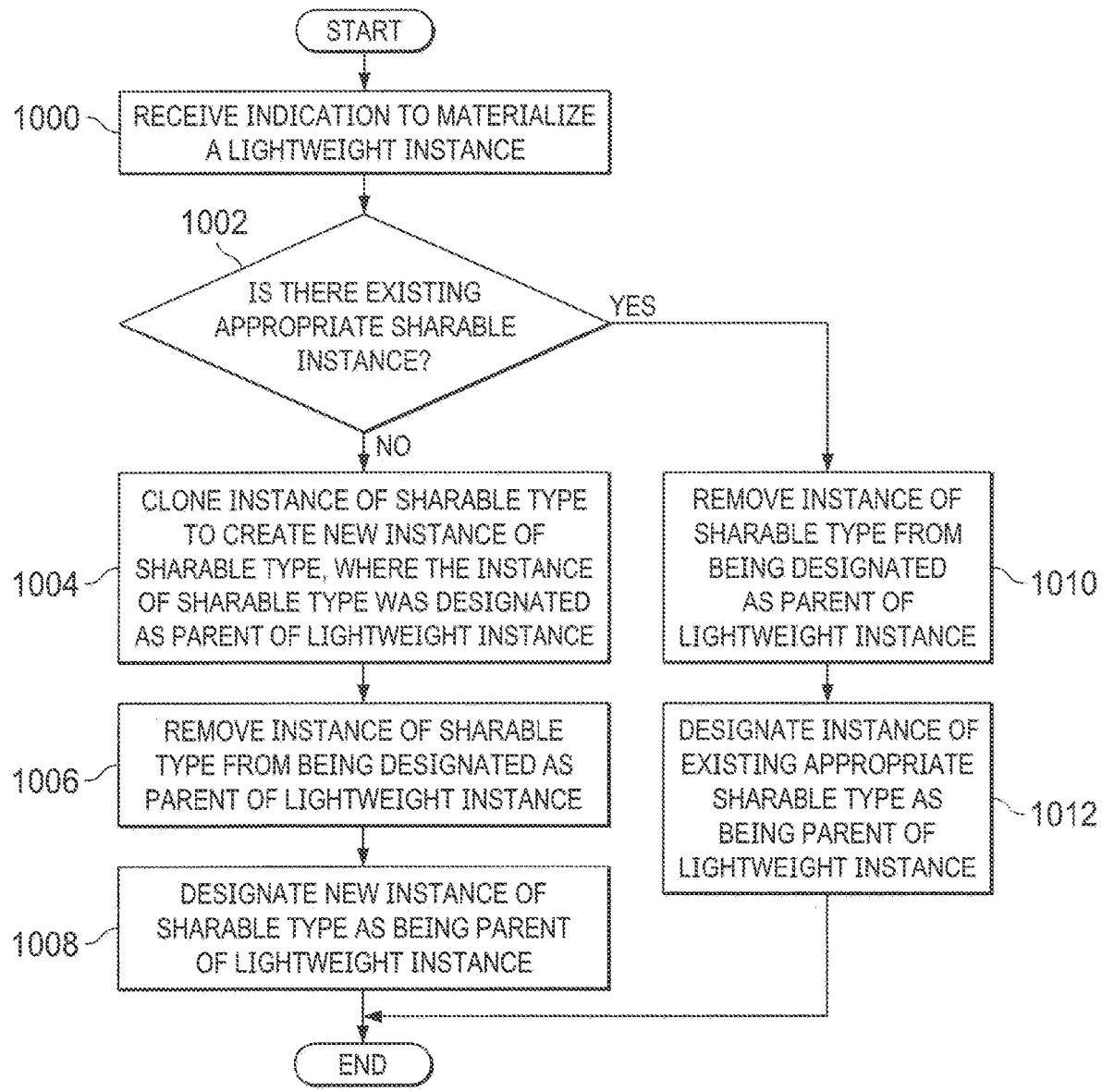
FIG. 10 is a flow diagram illustrating an embodiment of reparenting and materializing.

FIG. 10 is a flow diagram illustrating an embodiment of reparenting and materializing. In some embodiments, reparenting is used instead of materializing, where an existing sharable instance is appropriate and is reused instead of creating a new sharable instance. In the example shown, in 1000 an indication is received to materialize a lightweight instance. In 1002, it is determined whether there is an existing appropriate sharable instance. In the event that there is not an existing appropriate sharable instance, then in 1004, an instance of the sharable type is cloned to create a new instance of the sharable type, where the instance of the sharable type was designated as the parent of the lightweight instance. In 1006, the instance of the sharable type is removed from being designated as the parent of the lightweight instance. In 1008, the new instance of the sharable type is designated as being the parent of the lightweight instance, and the process ends. In the event that there is an existing appropriate sharable instance, then in 1010 the instance of the sharable type is removed for being designated as the parent of the lightweight instance. In 1012, the instance of the existing appropriate sharable type is designated as being the parent of the lightweight instance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing content using lightweight objects, comprising a hardware processor operatively coupled to a computer-readable memory, wherein the processor is configured to:
    store, in a computer-readable memory, a plurality of lightweight composite object instances as a plurality of lightweight object instances that refer to a shareable instance as a parent, wherein only a single copy of the shareable instance is stored in the computer-readable memory for the plurality of lightweight composite object instances, and not a copy for each of the plurality of lightweight composite object instances;
    receive a request to delete a lightweight composite object instance, wherein the lightweight composite object instance comprises an instance of a lightweight type, the lightweight type having a shareable type designated as a parent of the lightweight type, wherein the lightweight type inherits one or more behaviors or data from the shareable type, the lightweight composite object instance having the shareable instance designated as a parent instance of the instance of the lightweight type, wherein the lightweight composite object instance inherits the one or more behaviors or data from the shareable instance;
    responsive to the request:
        delete the instance of the lightweight type;
        determine whether the sharable instance is being shared by another lightweight composite object instance;
        if the sharable instance is not being shared by another lightweight composite object instance, delete the sharable instance; and
        if the sharable instance is being shared by another lightweight composite object instance, retain the sharable instance.

2. The system of claim 1, wherein the lightweight composite object instance and the shareable instance are stored in a memory coupled to the hardware processor.

3. The system of claim 2, wherein the memory comprises a data repository of a content server, and wherein the lightweight composite object instance and the shareable instance are stored in a database in the data repository.

4. The system of claim 1, wherein the lightweight composite object instance comprises at least a base class instance and a subclass instance; wherein the base class instance is a single base class instance that is shared by each of a plurality of lightweight composite object instances; and wherein the subclass instance is not shared by each of the plurality of lightweight composite object instances.

5. The system of claim 1, wherein the shareable type includes a set of higher class types that are common to each heavyweight type of a group of heavyweight types, and wherein the lightweight type includes a set of lower class types that are not common to each heavyweight type of the group of heavyweight types.

6. The system of claim 1, wherein determining whether the sharable instance is being shared by another lightweight composite object instance comprises determining whether the shareable instance is being shared by a lightweight instance.

7. A computer program product comprising a non-transitory computer-readable memory having stored thereon instructions for:
    storing, in a computer-readable memory, a plurality of lightweight composite object instances as a plurality of lightweight object instances that refer to a shareable instance as a parent, wherein only a single copy of the shareable instance is stored in the computer-readable memory for the plurality of lightweight composite object instances, and not a copy for each of the plurality of lightweight composite object instances;
    receiving a request to delete a lightweight composite object instance, wherein the lightweight composite object instance comprises an instance of a lightweight type, the lightweight type having a shareable type designated as a parent of the lightweight type, wherein the lightweight type inherits one or more behaviors or data from the shareable type, the lightweight composite object instance having the shareable instance designated as a parent instance of the instance of the lightweight type, wherein the lightweight composite object instance inherits the one or more behaviors or data from the shareable instance;

responsive to the request:
   deleting the instance of the lightweight type;
   determining whether the sharable instance is being shared by another lightweight composite object instance;
   if the sharable instance is not being shared by another lightweight composite object instance, deleting the sharable instance; and
   if the sharable instance is being shared by another lightweight composite object instance, retaining the sharable instance.

8. The computer program product of claim 7, further comprising instructions for, prior to deleting the lightweight composite object instance, storing the lightweight composite object instance and the shareable instance in a memory.

9. The computer program product of claim 8, wherein the memory comprises a data repository of a content server, wherein storing the lightweight composite object instance comprises storing the lightweight composite object instance in a database in the data repository.

10. The computer program product of claim 7, wherein the lightweight composite object instance comprises at least a base class instance and a subclass instance;
   wherein the base class instance is a single base class instance that is shared by each of a plurality of lightweight composite object instances; and wherein the subclass instance is not shared by each of the plurality of lightweight composite object instances.

11. The computer program product of claim 7, wherein the shareable type includes a set of higher class types that are common to each heavyweight type of a group of heavyweight types, and wherein the lightweight type includes a set of lower class types that are not common to each heavyweight type of the group of heavyweight types.

12. The computer program product of claim 7, wherein determining whether the sharable instance is being shared by another lightweight composite object instance comprises determining whether the shareable instance is being shared by a lightweight instance.

13. A computer implemented method comprising:
   storing, in a computer-readable memory, a plurality of lightweight composite object instances as a plurality of lightweight object instances that refer to a shareable instance as a parent, wherein only a single copy of the shareable instance is stored in the computer-readable memory for the plurality of lightweight composite object instances, and not a copy for each of the plurality of lightweight composite object instances;
   receiving a request to delete a lightweight composite object instance, wherein the lightweight composite object instance comprises an instance of a lightweight type, the lightweight type having a shareable type designated as a parent of the lightweight type, wherein the lightweight type inherits one or more behaviors or data from the shareable type, the lightweight composite object instance having the shareable instance designated as a parent instance of the instance of the lightweight type, wherein the lightweight composite object instance inherits the one or more behaviors or data from the shareable instance;
   responsive to the request:
      deleting the instance of the lightweight type;
      determining whether the sharable instance is being shared by another lightweight composite object instance;
      if the sharable instance is not being shared by another lightweight composite object instance, deleting the sharable instance; and
      if the sharable instance is being shared by another lightweight composite object instance, retaining the sharable instance.

14. The method of claim 13, further comprising, prior to deleting the lightweight composite object instance, storing the lightweight composite object instance and the shareable instance in a memory.

15. The method of claim 14, wherein the memory comprises a data repository of a content server, wherein storing the lightweight composite object instance comprises storing the lightweight composite object instance in a database in the data repository.

16. The method of claim 13, wherein the lightweight composite object instance comprises at least a base class instance and a subclass instance; wherein the base class instance is a single base class instance that is shared by each of a plurality of lightweight composite object instances; and wherein the subclass instance is not shared of each of the plurality of lightweight composite object instances.

17. The method of claim 13, wherein the shareable type includes a set of higher class types that are common to each heavyweight type of a group of heavyweight types, and wherein the lightweight type includes a set of lower class types that are not common to each heavyweight type of the group of heavyweight types.

18. The method of claim 13, wherein determining whether the sharable instance is being shared by another lightweight composite object instance comprises determining whether the shareable instance is being shared by a lightweight instance.

* * * * *